US005559942A

United States Patent [19]
Gough et al.

[11] Patent Number: 5,559,942
[45] Date of Patent: Sep. 24, 1996

[54] METHOD AND APPARATUS FOR PROVIDING A NOTE FOR AN APPLICATION PROGRAM

[75] Inventors: Michael L. Gough, Ben Lomond; Bruce V. Holloway, Marina, both of Calif.

[73] Assignee: Apple Computer, Inc., Cupertino, Calif.

[21] Appl. No.: 59,468

[22] Filed: May 10, 1993

[51] Int. Cl.$^6$ .................................................. G06F 3/14
[52] U.S. Cl. ........................................ 395/155; 395/159
[58] Field of Search ............................ 395/155, 161, 395/157, 159; 345/119, 145, 113, 179; 364/237.1, 927.6

[56] References Cited

U.S. PATENT DOCUMENTS

| | | | |
|---|---|---|---|
| 5,129,057 | 7/1992 | Strope et al. | 395/161 |
| 5,165,012 | 11/1992 | Crandall et al. | 395/157 X |
| 5,237,651 | 8/1993 | Randall | 395/155 X |
| 5,283,560 | 1/1994 | Bartlett | 345/113 |
| 5,283,862 | 2/1994 | Lund | 395/155 |
| 5,307,086 | 4/1994 | Griffin et al. | 395/155 X |
| 5,341,293 | 8/1994 | Vertelney et al. | 395/159 |
| 5,367,623 | 11/1994 | Iwai et al. | 395/157 |
| 5,398,310 | 3/1995 | Tchao et al. | 395/155 X |
| 5,404,442 | 4/1995 | Foster et al. | 395/159 |

OTHER PUBLICATIONS

Phillips, "MediaView: A General Multimedia Digital Publication System," Communications of the ACM, Jul. 1991, vol. 34, No. 7, pp. 75–83.
Microsoft Mail User's Guide, Microsoft Corporation, 1992, pp. 1–4, 27.

Primary Examiner—Raymond J. Bayerl
Assistant Examiner—Crescelle N. dela Torre
Attorney, Agent, or Firm—Hickman Beyer & Weaver

[57] ABSTRACT

A method and apparatus for providing a note on an application program includes noticing a note anchor object associated with a data file displayed by an application program on a computer screen and displaying a note slip image over the displayed data and images of the application program. Many anchor objects and note slips may be displayed on the screen at once, and a single anchor object is preferably associated with a single note slip. The note slip is preferably receptive to pen-based inputs, and may be resized or moved on the screen. The anchor object includes a visual picture data portion and a picture comment data portion that descibes the note slip associated with that anchor object. The anchor object preferably exists as a standard graphical picture in the application program and can be manipulated as such. The present invention thus allows note slips to be displayed in existing application programs, either pen-compatible or non-pen-compatible.

49 Claims, 14 Drawing Sheets

| POSITION NUMBER | INDIVIDUAL IMAGE | PICTURE COMMENTS CACHE |
|---|---|---|
| 1 |  ←123 | PICTURE COMMENT #1 |
| 2 |  ←124 | PICTURE COMMENT #2 |
| 3 |  ←122, ←121 | PICTURE COMMENT #3 |
| 4 |  | PICTURE COMMENT #4 |
| ⋮ | ⋮ | ⋮ |
| N |  | PICTURE COMMENT #N |

PICTURE COMMENTS

METHOD AND APPARATUS FOR PROVIDING A NOTE FOR AN APPLICATION PROGRAM

BACKGROUND OF THE INVENTION

This invention relates generally to computer systems, and more particularly to graphical user interfaces for computer systems.

Graphical user interfaces or GUI are becoming increasingly popular with computer users. It is generally accepted that computers having graphical user interfaces are easier to use, and that it is quicker to learn an application program in a GUI environment than in a non-GUI environment.

A relatively new type of computer which is well suited for graphical user environments is the pen-based or pen-aware ("pen") computer system. A pen-based computer system is typically a small, hand-held computer where the primary method for inputting data includes a "pen" or stylus. A pen-aware computer system is one which has been modified to accept pen inputs in addition to traditional input methods. A pen computer system is often housed in a relatively flat enclosure, and has a dual-function display assembly which serves as both an input device and an output device. When operating as an input device, the display assembly senses the position of the tip of a stylus on the viewing screen and provides this positional information to the computer's central processing unit (CPU). Some display assemblies can also sense the pressure of the stylus on the screen to provide further information to the CPU. When operating as an output device, the display assembly presents computer-generated images on the screen.

The dual-function display assemblies of pen-based computer systems permit users to operate the computer as a computerized notepad. For example, graphical images can be input into the pen-based computer by merely moving the stylus across the surface of the screen. A stroke is defined as the engagement of the screen with a stylus, the movement of the stylus across the screen (if any), and its subsequent disengagement from the screen. As the CPU senses the position and movement of the stylus, it generates a corresponding image on the screen to create the illusion that the stylus is drawing the image directly upon the screen, i.e. that the stylus is "inking" an image on the screen. With suitable recognition software, text and numeric information can also be entered into the pen-based computer system in a similar fashion. Besides serving as a notepad, pen computers can provide a number of useful functions, such as serving as an address book, an appointment calendar, a to-do list, etc.

Text, graphical pictures or other images ("images") are often displayed on a computer screen by an application program. It is sometimes desirable to add annotations or "notes" to these images. Notes include comments, explanations, observations, doodles, etc. typically written near a section of displayed images. The notes might remind the reader of a related topic, comment on a section of text, or otherwise indicate to the reader the importance or relevance of a specific area in the document or data file being viewed.

Notes, by their nature, should be simple and easy to add to a document. Since notes are generally extra commentary or explanation of a section of a document or data file, they are not typically entered into the document itself, nor are they printed when the document is printed.

Pen computer systems are especially well suited for use of notes in text and other documents. Portable pen computer systems in particular are ideal to view a document at the user's convenience and add notes where needed. The pen input mechanism, typically a stylus, is also well suited to enter notes, since the user can simply and quickly write comments and words as "ink" in a section of a document as desired without having to use a relatively cumbersome input device, such as a keyboard.

Application programs can be modified for pen-based and pen-aware computer systems which could provide a note-taking capability. However, this is an expensive project for application developers, and requires end users to buy updated versions of their application programs.

What is needed is an annotation or note utility program that allows the user to attach notes to an unmodified application program. The note utility should be able to be used with both pen-compatible and non-pen-compatible software.

SUMMARY OF THE INVENTION

A method and apparatus of the present invention permits quick, straightforward input of pen-based note slips to a document of an unmodified application program running on a pen computer system. The note slips can preferably be added to many application programs capable of displaying graphical images. The application program does not need to be penaware, or even note-aware.

A method for providing a note on an application program image includes noticing a note anchor object associated with application data developed by an application program and displaying a note slip image over an application image, such as a window in a graphical user interface environment. The note anchor object is preferably includes a small graphical image displayed by the application program that may be deleted, moved, etc. like any graphical image. The note slip is an image that preferably accepts note data entered by a stylus or other pointing device. The note slip is associated with the note anchor object, and is preferably moved or deleted with that note anchor object. Many note slip images and note anchor objects may be displayed at once on the computer screen.

A note anchor object preferably includes two portions: a visual picture data portion and a picture comment data portion. The visual picture data portion includes the data required for the application program to display a representative graphical image of the anchor object. Each anchor object on the computer screen is displayed with a slightly different visual picture data so that video memory scanning software can distinguish between different anchor objects. The picture comment data portion includes the note slip image data describing the words and strokes entered by the user, stored in a vector format, as well as note slip image size and position.

A pen computer system in accordance with the present invention includes a central processing unit (CPU); a screen coupled to the CPU; a tablet mechanism; a stylus for entering data on the tablet mechanism; a mechanism for noticing the note anchor object; a mechanism for displaying the note slip image over the application image; and a mechanism for entering note data images on said note slip image using the stylus and the tablet mechanism. Preferably, the user can select between opaque note slips and translucent note slips, the latter permitting portions of the underlying application images to be visible. Other forms of the present invention include note slips with a variable size and movement independent of the anchor object.

The present invention allows quick, pen-based input of note data onto note slips in a data file of an application program. Since the anchor objects are displayed as standard graphical images, non-pen-based application programs can include pen-based note slips.

These and other advantages of the present invention will become apparent upon a reading of the following descriptions and a study of the various figures of the drawing.

DETAILED DESCRIPTION OF THE PREFERRED EMBODIMENTS

The present invention is well suited for pointer based computer systems such as the pen-based, pen-aware and mouse-based systems that are currently popular. For the purposes of illustration, the invention will be described in connection with a pen-based or pen-aware systems, hereinafter referred to as "pen computer systems", "pen systems", and the like. The present invention, however, can also be used with other computer systems, such as keyboard based systems.

Figure 1:
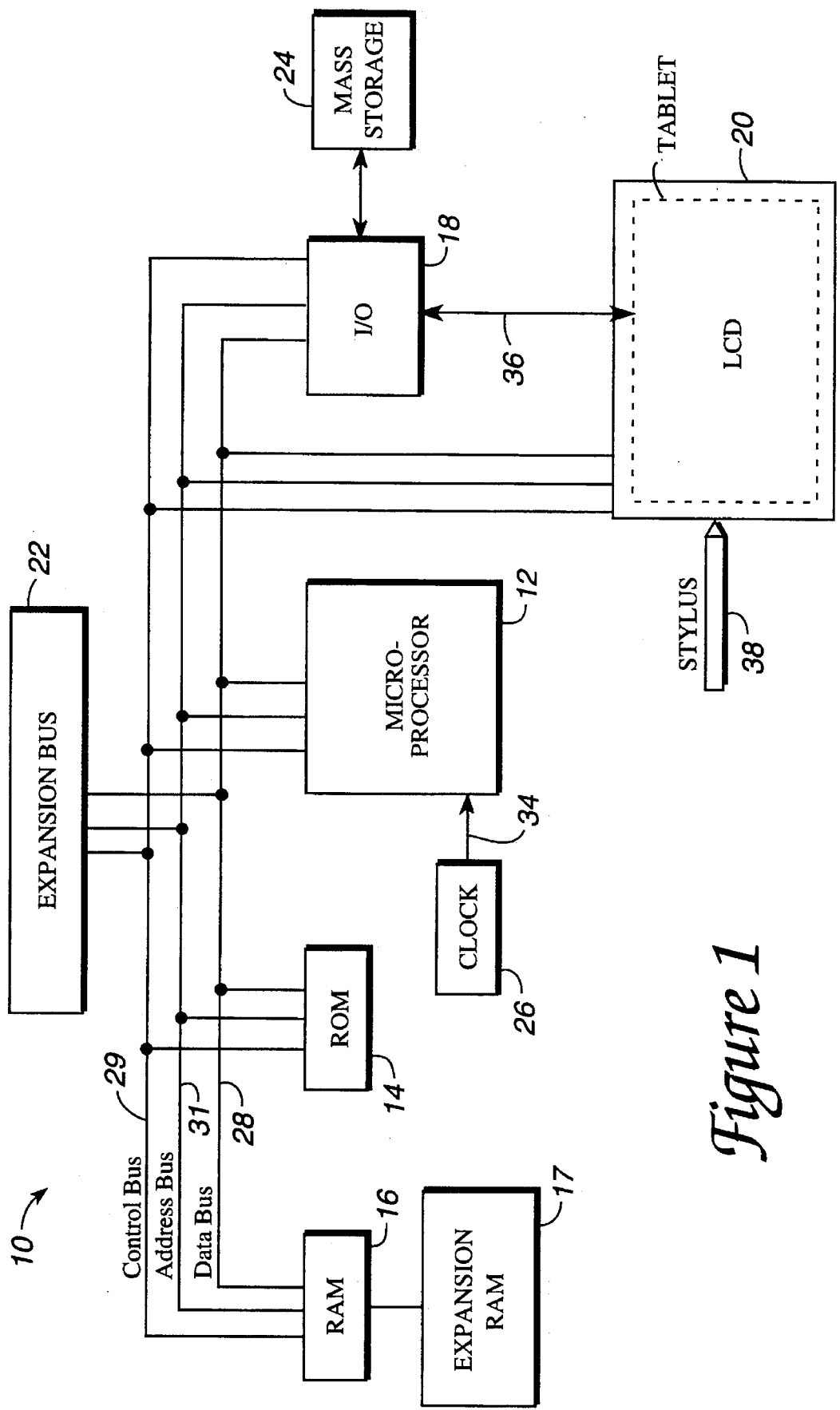
FIG. 1 is a block diagram of a pen computer system in accordance with the present invention.

As shown in FIG. 1, a pen computer system 10 in accordance with the present invention includes a central processing unit (CPU) 12, read only memory (ROM) 14, random access memory (RAM) 16, expansion RAM 17, input/output (I/O) circuitry 18, display assembly 20, and expansion bus 22. The pen computer system 10 may also optionally include a mass storage unit 24 such as a disk drive unit or nonvolatile memory such as flash memory and a real-time clock 26.

The CPU 12 is preferably a commercially available, single chip microprocessor, and is preferably a complex instruction set computer (CISC) chip such as the 68040 microprocessor available from Motorola, Inc. CPU 12 is coupled to ROM 14 by a data bus 28, control bus 29, and address bus 31. ROM 14 contains the basic operating system for the pen computer system 10. CPU 12 is also connected to RAM 16 by busses 28, 29, and 31 to permit the use of RAM 16 as scratch pad memory. Expansion RAM 17 is optionally coupled to RAM 16 for use by CPU 12. CPU 12 is also coupled to the I/O circuitry 18 by data bus 28, control bus 29, and address bus 31 to permit data transfers with peripheral devices.

I/O circuitry 18 typically includes a number of latches, registers and direct memory access (DMA) controllers. The purpose of I/O circuitry 18 is to provide an interface between CPU 12 and such peripheral devices as display assembly 20 and mass storage 24.

Display assembly 20 of pen-based computer system 10 is both an input and an output device. Accordingly, it is coupled to I/O circuitry 18 by a bi-directional data bus 36. When operating as an output device, the display assembly 20 receives data from I/O circuitry 18 via bus 36 and displays that data on a suitable screen. The screen for display assembly 20 is preferably a liquid crystal display (LCD) of the type commercially available from a variety of manufacturers. The input device of display assembly 20 is can be a thin, clear membrane which covers the LCD display and which is sensitive to the position of a stylus 38 on its surface. Alternatively, the screens can be provided with an embedded RF digitizer and an "active" RF stylus. There are also other types of combination screen/tablet technologies. Combination display assemblies such as display assembly 20 are available from a variety of vendors.

Other types of user inputs can also be used in conjunction with the present invention. While the method of the present invention is described in the context of a pen system, other pointing devices such as a computer mouse, a track ball, or a tablet can be used to manipulate a pointer on a screen of a general purpose computer. Therefore, as used herein, the terms "pointing device", "pointer inputs" and the like will refer to any mechanism or device for pointing to a particular location on a screen of a computer display.

Some type of mass storage 24 is generally considered desirable. However, the mass storage 24 can be eliminated by providing a sufficient amount of RAM 16 and expansion RAM 17 to store user application programs and data. In that case, RAMs 16 and 17 could be provided with a backup battery to prevent the loss of data even when the pen computer system 10 is turned off. However, it is generally desirable to have some type of long term storage 24 such as a commercially available miniature hard disk drive, nonvolatile memory such as flash memory, battery backed RAM, PC-data cards, or the like.

In operation, information is input into the pen computer system 10 by "writing" on the screen of display assembly 20 with the stylus 38. Information concerning the location of the stylus 38 on the screen of the display assembly 20 is input into the CPU 12 via I/O circuitry 18. Typically, this information comprises the Cartesian (i.e. x & y) coordinates of a pixel of the screen of display assembly 20 over which the tip of the stylus is positioned. Commercially available combination display assemblies include appropriate circuitry to provide the stylus location information as digitally encoded data to the I/O circuitry of the present invention. The CPU 12 then processes the data under control of an operating system and possibly an application program stored in ROM 14 and/or RAM 16. The CPU 12 then produces data which is output to the display assembly 20 to produce appropriate images on its screen.

Expansion bus 22 is coupled to the data bus 28, the control bus 29, and the address bus 31, similar to the other components in system 10. Expansion bus 22 provides extra ports to couple devices such as modems, display switches, microphone, speaker, etc. to the CPU 12.

Figure 2:
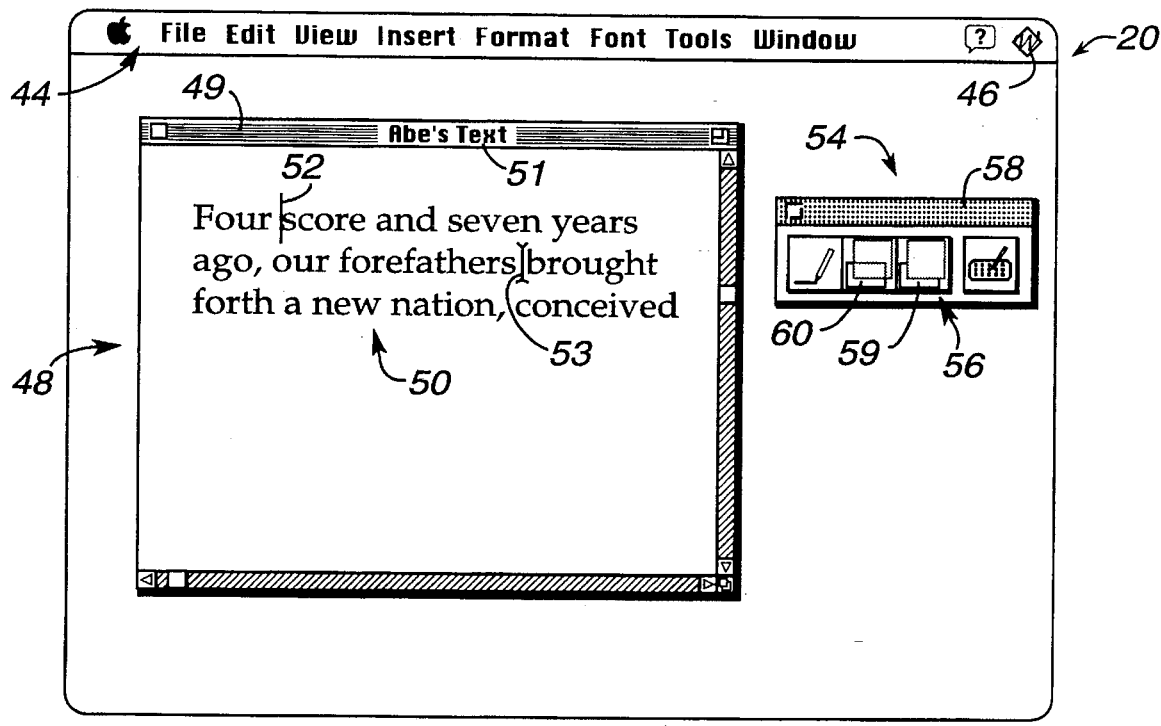
FIG. 2 is a display screen of the computer system of FIG. 1 showing a word processing application window and illustrating the activation of a note slip of the present invention.

In FIG. 2, a display screen 20 of a computer system is shown. In the preferred embodiment, screen 20 is the LCD input/output display of the pen computer system shown in FIG. 1. A display from an Apple Macintosh System 7.0 operating system environment is shown as an example; however, many operating systems (such as MS-DOS and UNIX operating systems) used on a computer capable of running application programs are applicable to the present invention. Menu titles 44, when touched with a pointing device, will display pull-down menus, which include selections that can be activated with the pointing device. Icon 46 indicates which application program in memory is currently "active" (see below).

Window 48 is displayed by a currently active application program. A window, such as window 48, may be moved on the screen, erased ("closed"), or resized at the user's convenience, as is well-known to those skilled in the art. In FIG. 2, window 48 is displayed from a word processing application program, Microsoft Word, in which text files may be input, output, or edited. As referenced herein, "application program" refers to programs such as word processors, spreadsheets, drawing programs, etc. that can run under an operating system.

In other operating systems, application programs do not display windows such as window 48, but simply display images from a data file directly to the screen 20. For example, in many MS-DOS systems, text is written to the screen without a window. However, the text is still an image created by the application program from a data file. Windows, text, etc. can be considered "application images" since they are displayed on the computer screen by an application program.

Icon 46 and lines 49 indicate that Microsoft Word is the currently active application program. Herein, an "active" application program is one whose open window can be manipulated, edited, moved, etc. For example, a word processing program window, such as window 48, is active if the text that the word processor window displays can be changed or edited; the active word processing window can also be dragged, resized, or closed by clicking on specific areas of the window. In operating systems that do not use windows, "active" has no significance, and instead refers to the application program that is currently displaying data on the screen and is responsive to user input.

Lines of text 50 in window 48 have been entered and saved in a data file "Abe's Text", as indicated by display 51. Since the data file "Abe's Text" is separately stored on a hard disk or other storage device and its data is displayed by the Microsoft Word application program, "Abe's Text" can be considered "application data", i.e. a data file whose data is retrieved by an application program and displayed on the screen as an application image. Text 50 may be changed or edited by placing a cursor 52 on the text 50 and entering or deleting characters using, for example, a keyboard or pointing device. Typically, characters are inserted after the cursor 52 on the current line of text 50; entered characters can write over other characters present or can be inserted in a line of text. "I-beam" cursor 53 shows where a pointing device is currently pointing.

A "gadget bar" 54 is also displayed on display screen 20. Gadget bar 54 is displayed by a program that offers a selection of utilities, or "gadgets", for a computer system. These utility programs are represented by icons 56, and are typically grouped according to related functionality. Gadget bar 54 is a form of "palette"; dotted bar 58 indicates this status. Gadget bar 54 (like other palettes) may be closed, dragged, or used freely at any time, regardless of any active window, such as window 48. In the preferred embodiment, gadget bar 54 is implemented using the Penboard software system, described in co-pending U.S. patent application Ser. No. 08/060,438 filed on May 10, 1993 on behalf of Gough et al. entitled "Method and Apparatus for Interfacing with a Computer System" assigned to the assignee of the present application, the disclosure of which is hereby incorporated by reference in its entirety.

The activation of a utility from gadget bar 54 is preferably accomplished with a pointing device. For utilities like the present invention, the user simply selects a desired icon 56 with a single "click" of the pointing device button; in the present embodiment, the desired note slip icons are icons 59 and 60. Icon 59 represents the utility controlling opaque note slips, and icon 60 represents the utility controlling translucent note slips (explained below). In embodiments where a pointing device is not used or not available, the icons 59 and 60 can be selected with keys on a keyboard, such as function keys.

When icon 59 or 60 is selected, control data is sent to the active application window 48 indicating that the note slip utility has been selected. A note anchor object is then inserted in the active application window (described with reference to FIG. 3).

Figure 3:
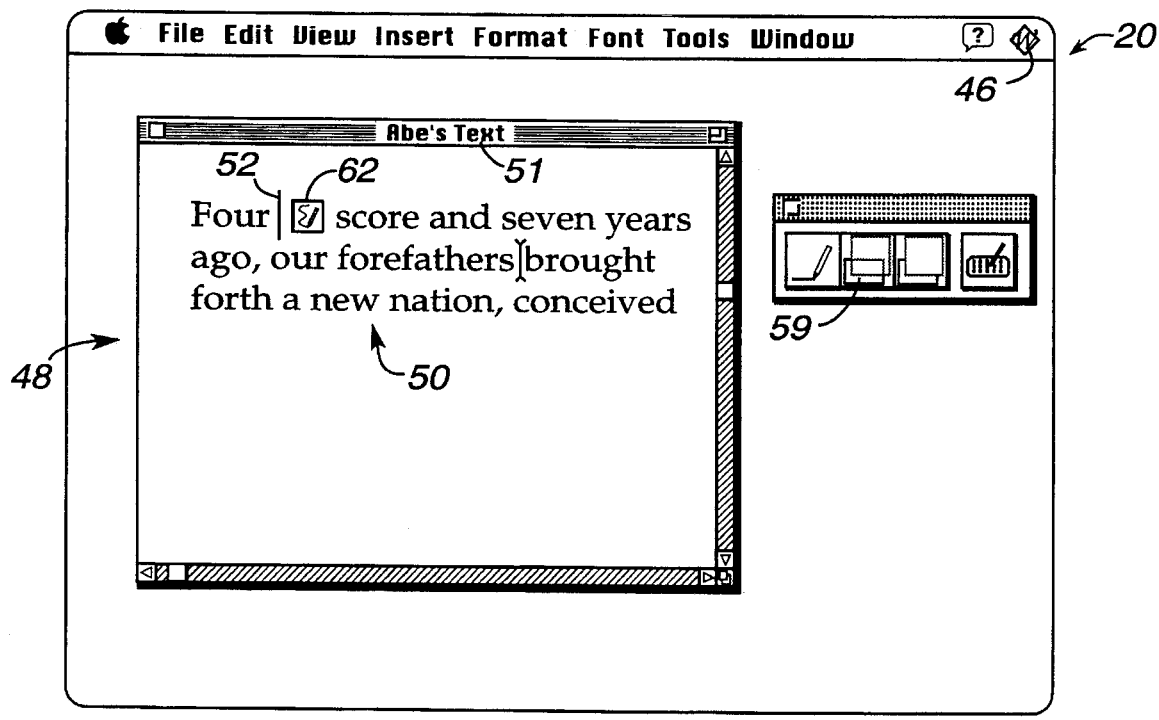
FIG. 3 is a display screen as shown in FIG. 2 showing a note anchor object of the present invention.

In FIG. 3, icon 59 has been selected and a note anchor object 62 of the present invention is displayed in window 48. Note anchor object 62 includes a small, icon-size graphical picture that is preferably similar in size to a text character. Note anchor "object" 62 has been inserted in the data file 51 at a particular location of the file and includes the displayed image on the screen as well as other invisible data (see below). To be able to display note anchor object 62, the application program (indicated by icon 46) must be able to display graphical pictures. For example, many currently-used word processing programs, including Microsoft Word, have the ability to display graphical images as well as text. For Apple Macintosh systems, such graphical pictures are often stored in a standardized format called PICT. The note slips utility sends graphical picture data, preferably in PICT format, to the active window 48, and the active application program displays the picture as a note anchor object 62 using standard graphical display procedures.

The term "object" has been used in the preceding discussion. As is well known to software developers, an "object" is a logical software unit comprising data and processes which give it capabilities and attributes. For example, an object can be queried as to its type and can return such data as the number of words that it contains. Objects can contain other objects of the same or of a different type. Objects can also be used to project images on a screen according to their object type. There are many well know texts which describe object oriented programming. See, for example, Object Oriented Programming for the Macintosh, by Kurt J. Schmucker, Hayden Book Company, 1986. The term "anchor object", as used herein, refers to the entire object including the graphical anchor image displayed on the screen and other data stored in the anchor object structure. When an anchor object is referred to as being "displayed" on the screen herein, the graphical image portion of the anchor object is being referenced.

The location at which anchor object 62 is displayed in window 48 depends on the method that the active application program uses to insert graphical pictures. In the preferred embodiment, anchor object 62 is "pasted" into active window 48 and data file 51 from a general memory buffer. "Cutting and pasting" is typically used in word processing and other application programs to move selected text or other data into a memory buffer ("cutting") and inserting the buffer data in a different section of the data file specified by the cursor 52 ("pasting"). Data representing the note anchor object 62 is thus first sent to buffer memory and then "pasted" into data file 51 and displayed in text 50 wherever cursor 52 is currently located. The creation of an anchor object in the preferred embodiment is described in detail with reference to FIG. 10.

Other application programs might "paste" in a different way. A drawing program might paste a picture from buffer memory to the location last selected by the pointing device. Or, a picture might be pasted at the current location pointed to by the pointing device.

Figure 4:
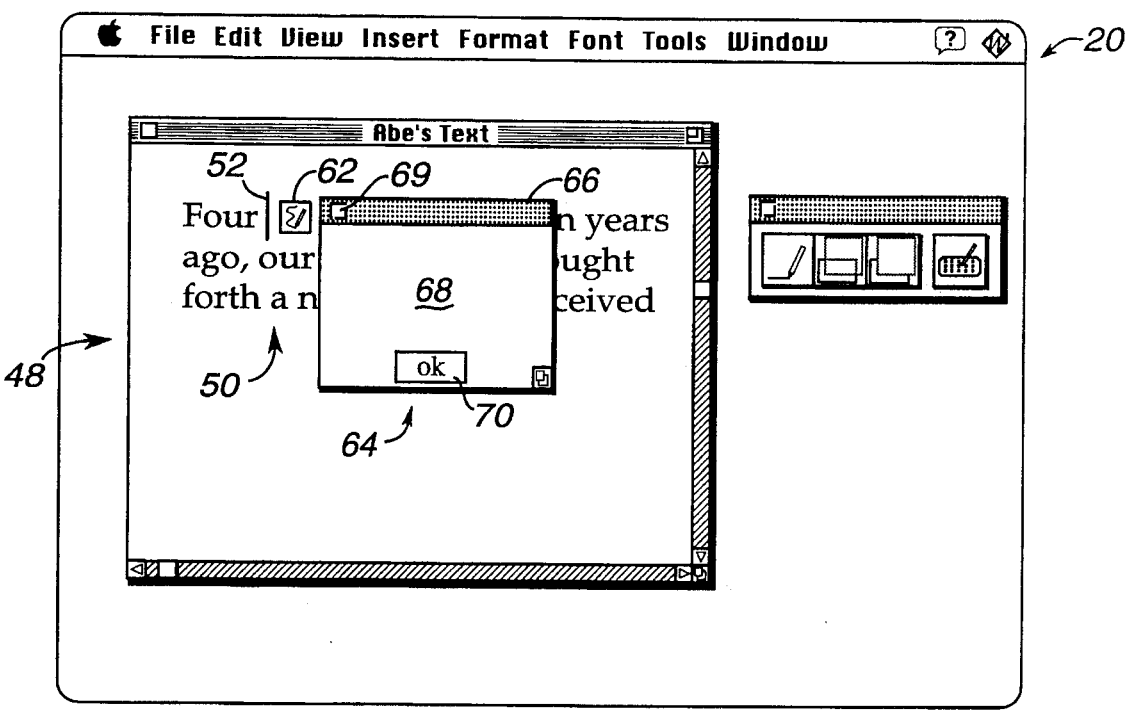
FIG. 4 is a display screen as shown in FIG. 2 showing a note slip and a note anchor object of the present invention.

In FIG. 4, note slip 64 is displayed in active window 48. Note slip 64 is an image displayed over any application images such as text 50 in response to selecting ("clicking") note anchor object 62. Note slip 64 is preferably displayed by the note slip program operating under the Penboard operating system, described in the aforementioned co-pending patent application Ser. No. 08/060,438, entitled "Method and Apparatus for Interfacing with a Computer System" by inventors Gough et al. In the preferred embodiment, note slip 64 is first displayed in close proximity to anchor object 62. Note slip 64 includes a header bar 66, writing area 68, and completion button 70. Header bar 66 has a dotted pattern, indicating that the note slip 64 is a palette, similar to gadget bar 54; however, note slip 64 is preferably a limited palette that is only active when window 48 is active. Header bar 66 includes a close box 69 that can be used to remove the note slip 64 from the screen; the contents of the note slip are preferably retained in the anchor object 62 (explained with reference to FIG. 10).

Writing area 68 is preferably receptive to pen input strokes and displays such strokes graphically (i.e. in "ink") as they are being drawn. The width of the strokes are determined from the note slip program through the Penboard system. If the stylus contacts the screen, ink is displayed; see FIG. 5. In other embodiments that do not include pointer devices, note data can be entered in writing area 68 with other input devices, such as a keyboard.

Completion button 70, when selected, informs the note slip program that the user is done updating the note slip. The button 70 is operative to "paste" the updated note slip data to the anchor object 62. A new anchor object with the updated note slip data is sent to the buffer memory and the new anchor object is pasted in place of the old anchor object; this process is detailed with reference to FIG. 13. The note slip 64 preferably remains displayed on the screen after button 70 is selected. If the user does not manipulate or edit the note slip 64 for a certain predetermined period of time, preferably two seconds, the CPU assumes that the note slip is complete and the completion button will automatically be selected.

Figure 5:
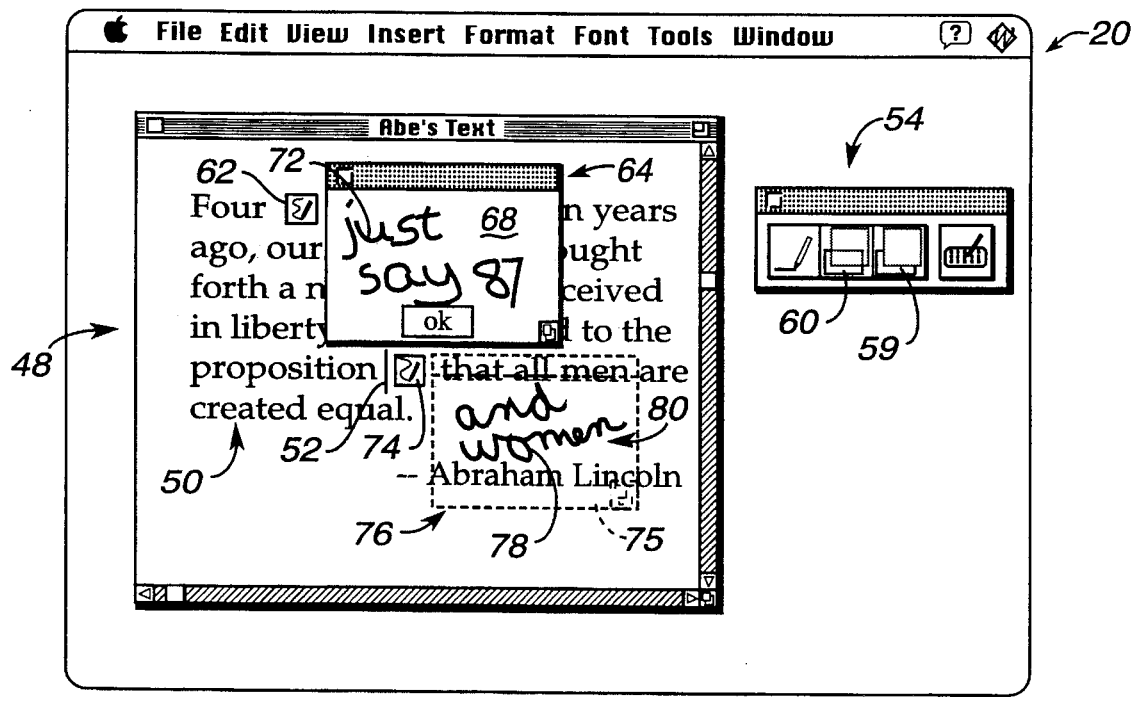
FIG. 5 is a display screen showing the insertion of a written message on the note slip of FIG. 3 and a translucent note slip image.

In FIG. 5, note data 72 or "ink" has been written in the writing area 68 of note slip 64. Software necessary to display ink in response to pointer inputs is well-known in the art. Since only the user needs to read the written ink, no recognition of the entered words is necessary. Note data 72 is displayed with graphical lines of a predefined width that most closely follow the strokes of the pointing device. The ink of note data 72 is made up of vectors referenced by coordinates, as explained with reference to FIG. 10c. A previously-written note may be edited by entering more strokes to writing area 68. In an alternate embodiment, a previously-written note may be partially or completely erased by selecting a specific control, for example, an erase button (not shown).

A second note anchor object 74 and note slip 76 is also shown in FIG. 5. Icons 59 or 60 can be selected at any time to insert a different anchor object 74 into active window 48 at the location of cursor 52. Many anchor objects may be inserted into data file 51 and are displayed at once in active window 48. In the preferred embodiment, every anchor object 62 and 74 has a single corresponding note slip 64 and 76, respectively. Anchor object 74 is slightly different visually than anchor object 62; this is explained with reference to FIG. 9a.

Note slip 76 is a translucent note slip. Words and characters of text 50 can be viewed through the note slip 76, as well as any other images displayed by the active application program. Note slip 76 is preferably defined in window 48 by outline 75 and preferably has all the functions of the previously described opaque note slip 64. Written notes 78 can be entered by the user anywhere in writing area 80, similarly to note slip 64. Using a translucent note slip 76, a user would typically write notes 78 in blank areas around text 50 so that the text 50 is not obscured by the written ink. Translucent note slip 76 and anchor object 74 are displayed by selecting icon 60 from gadget bar 54. The translucent note slip is produced in conjunction with Penboard by the method and apparatus disclosed in copending U.S. patent application Ser. No. 08/130,079, filed May 10, 1993 on behalf of Gough et al., entitled, "Method and Apparatus for Displaying an Overlay Image", assigned to the assignee of the present application, the disclosure of which is hereby incorporated by reference herein in its entirety.

Figure 6A:
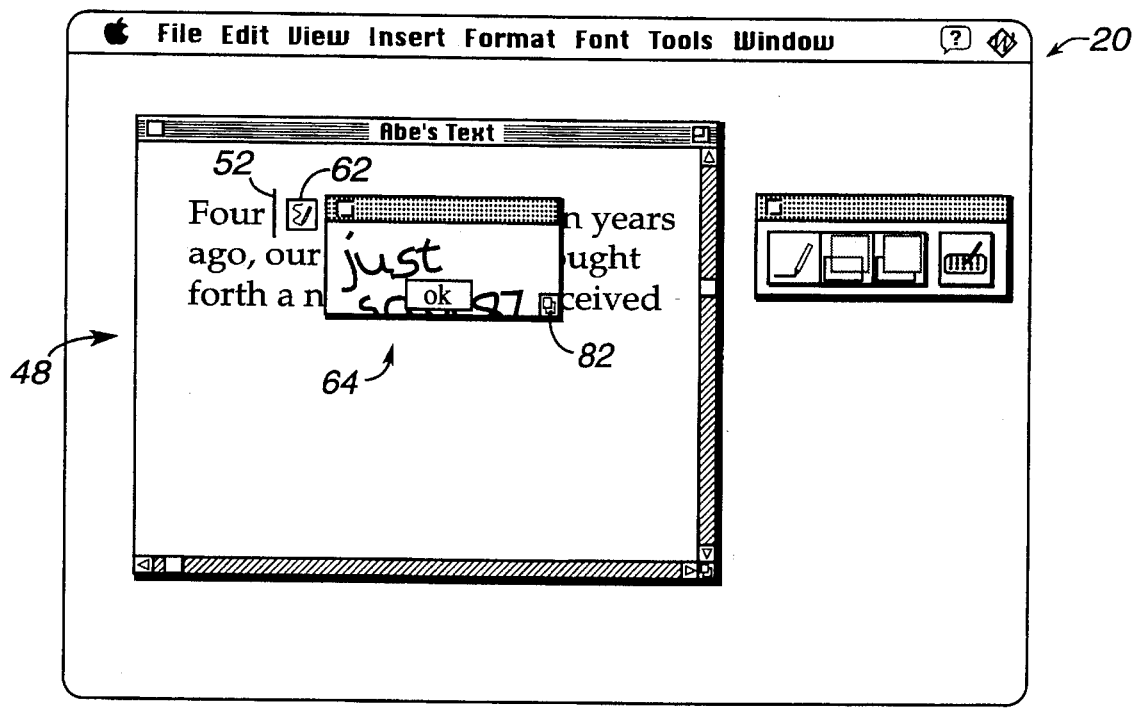
FIG. 6a is a display window of an application program showing a note slip adjusted to a smaller size.

In FIG. 6a, note slip 64 has been decreased in size. This is preferably accomplished by selecting the resize box 82 with a pointing device and "dragging" the note slip image to a smaller size. "Dragging" an icon with a mouse is typically accomplished by holding down the selection button on the mouse, then releasing the button after the object has been moved to its new location. "Dragging" with a pen or stylus involves engaging the icon with the stylus and moving the stylus to the desired position on the screen. The stylus is then lifted from the screen to leave the icon in its new position. The resize box 82 is like an icon that is dragged to a new location, and the sides of the note slip 64 are moved with the resize box.

Figure 6B:
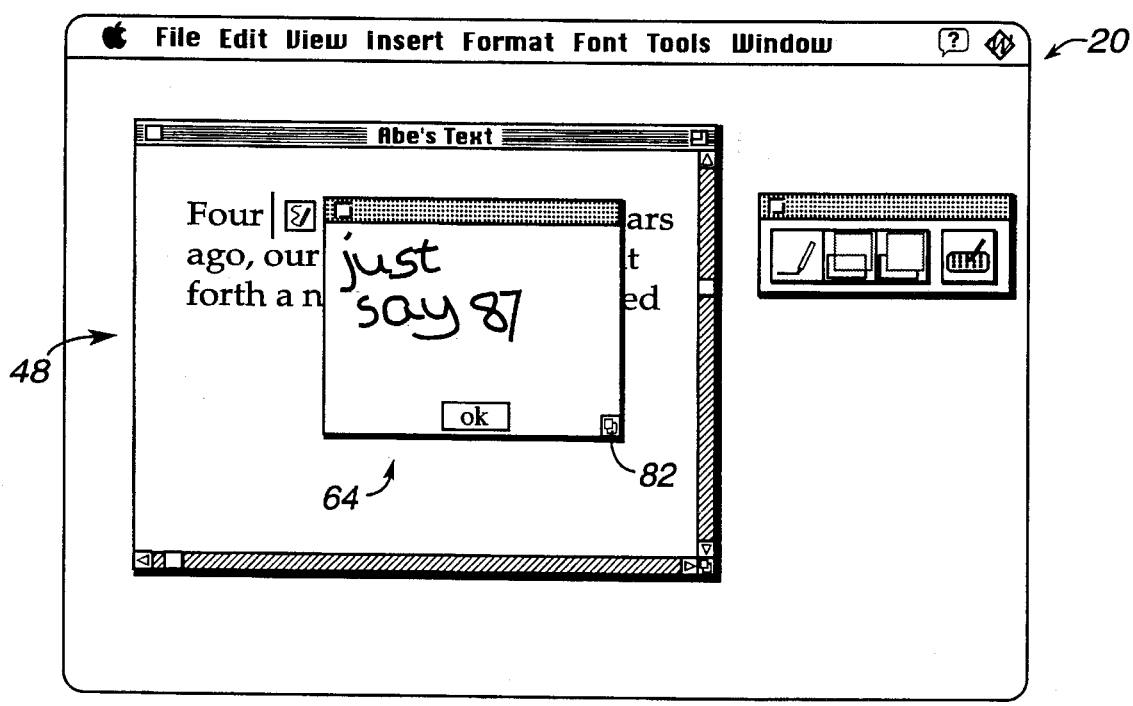
FIG. 6b is a display window of an application program showing a note slip adjusted to a larger size.

In FIG. 6b, note slip 64 has been increased in size. This is accomplished similarly to decreasing the size of the note slip as described with reference to FIG. 6a.

Figure 7A:
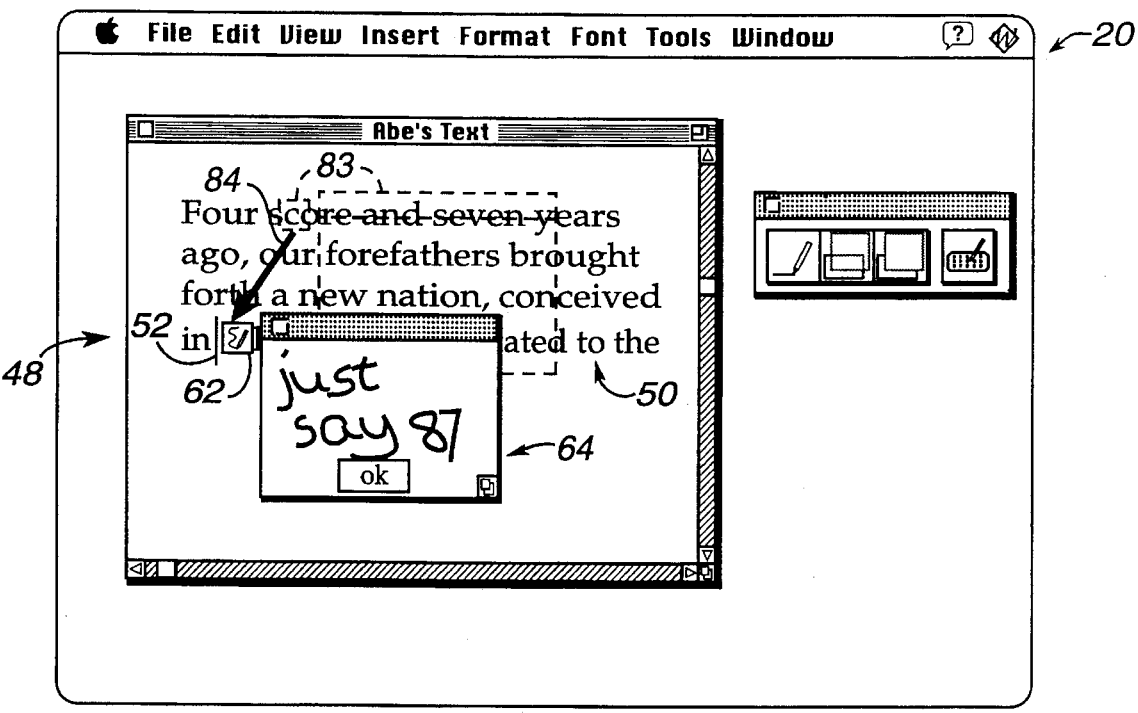
FIG. 7a is a display window of an application program showing the anchor object and note slip being moved together.

In FIG. 7a, anchor object 62 and note slip 64 have been moved within active window 48. Dashed outlines 83 indicate the old locations of anchor object 62 and note slip 64. Arrow 84 indicates that anchor object 62 has been dragged to a new location. When anchor object 62 is moved in this way, note slip 64 is also moved and is preferably always located a constant distance from anchor object 62. For example, Microsoft Word permits selected ("highlighted") text to be dragged, much like an icon or object. Anchor object 62 is selected by the cursor 52 and dragged to its new location, where it is inserted in text 50. The anchor object 62 is thus moved to a new location in data file 51.

Anchor object 62 can be moved using any method allowed by the application program to move graphical objects, including "cutting and pasting". Note slip 64 is moved with anchor object 62 when the anchor object is moved.

Figure 7B:
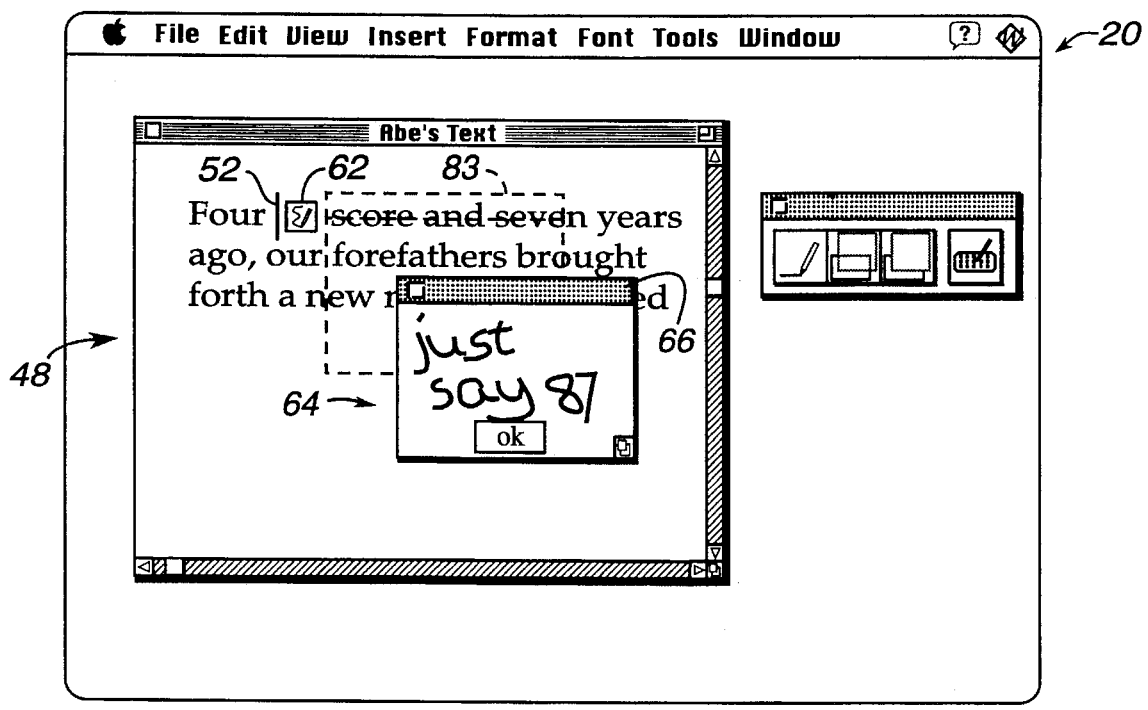
FIG. 7b is a display window of an application program showing the note slip being moved independently of the note anchor object.

In FIG. 7b, note slip 64 is moved independently of anchor object 62 within active window 48. This is accomplished by selecting header bar 66 with a pointing device and dragging the note slip to a new location. The location of anchor object 62 remains constant when note slip 64 is moved in this fashion.

Figure 8:
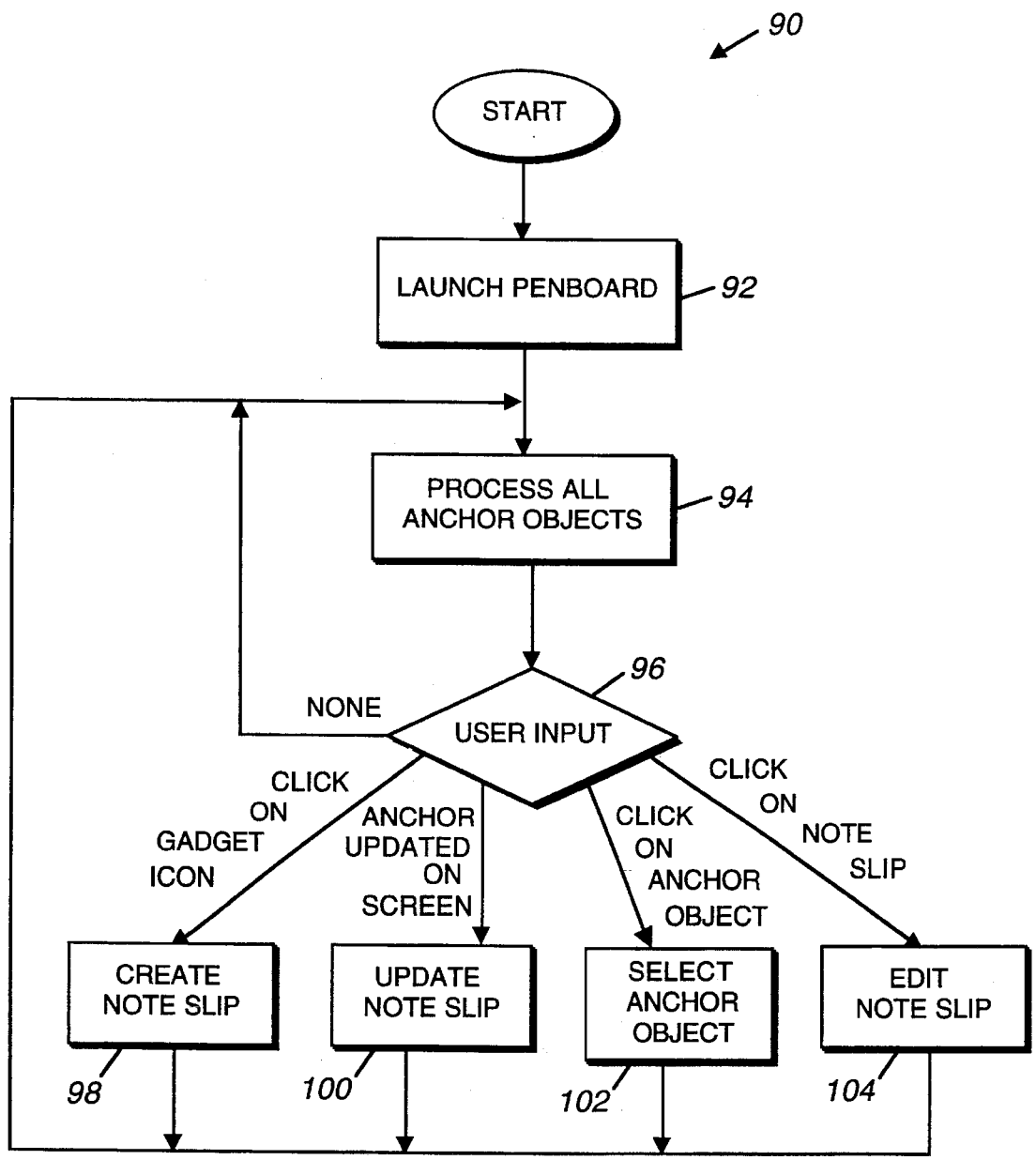
FIG. 8 is a flow diagram illustrating the method of the present invention.

FIG. 8 is a flow diagram 90 of a preferred computer implemented process in accordance with the present invention. In a first step 92, the Penboard software system is launched to run concurrently with any active window of an application program; the Penboard system includes the note slip program. In step 94, all anchor objects displayed in active window 48 are processed. This procedure is described with reference to FIG. 9.

Once all the currently existing anchor objects are processed, step 96 is implemented, in which the note slip program checks for certain user inputs. The nature of the user input is determined by the area or object of the screen selected. If the user selects icons 59 or 60 of gadget bar 54, then step 98, process Create Note Slip, is implemented, which is described with reference to FIG. 10. If the user updates anchor object 62 within text document 51, i.e. the anchor object is moved, deleted, copied, etc., then step 100, process Update Note Slip, is implemented. Process Update Note Slips is detailed with reference to FIG. 11. if the user clicks on an anchor object 62, step 102, process Select Anchor Object, is implemented. Process Select Anchor Object is detailed with reference to FIG. 12. Finally, if the user clicks on a note slip 64 to edit or update the note, step 102, Process Edit Note Slip, is implemented. Process Edit Note Slip is detailed with reference to FIG. 13. If there are no user inputs of the kinds listed above, then the process loops back to step 94 to again process all anchor objects on the screen.

After any of the processes described in steps 98, 100, 102 and 104 are implemented, the process loops back to step 94 to again process all anchor objects on the screen.

Figure 9:
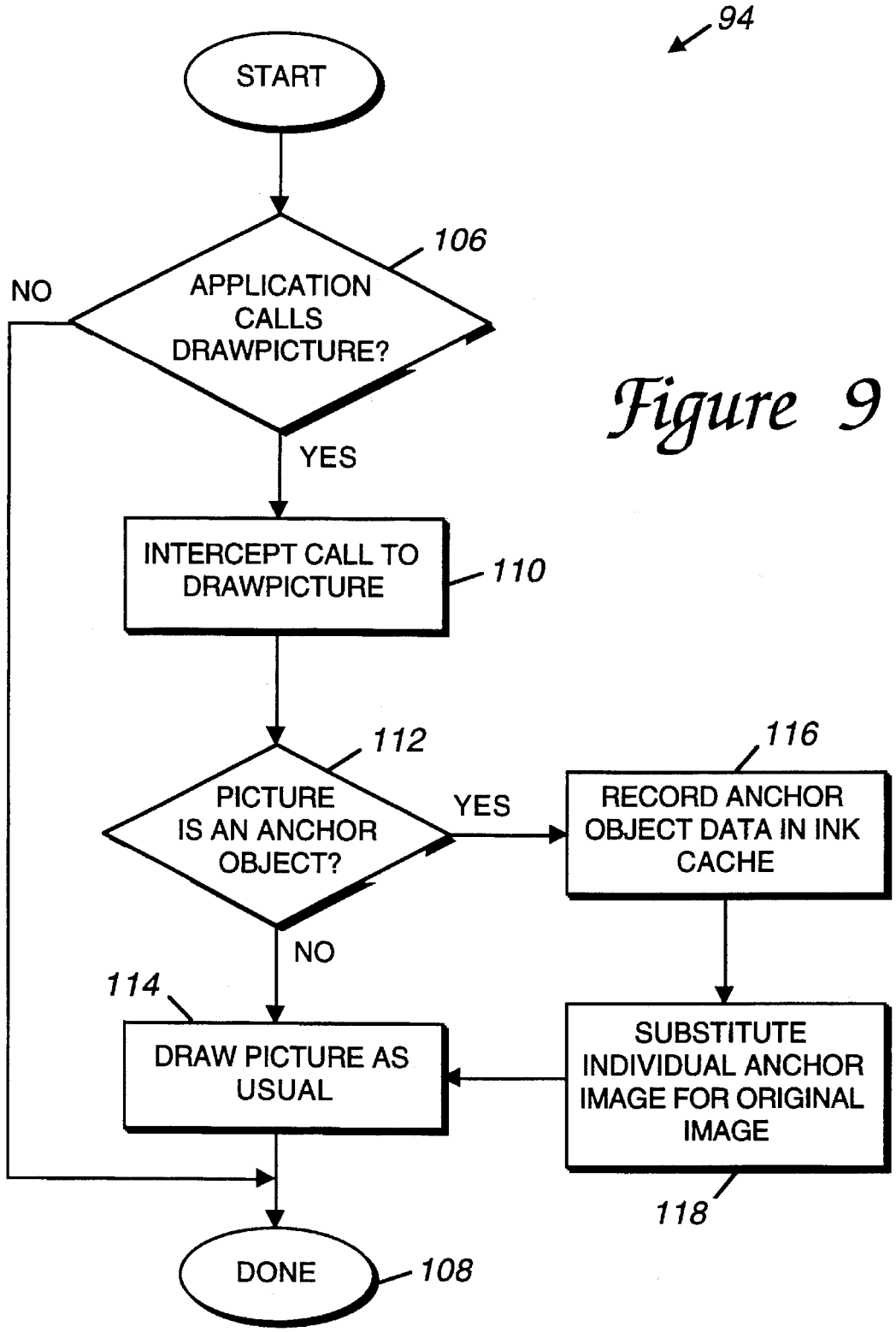
FIG. 9 is a flow diagram illustrating the "Process all anchor objects" step of FIG. 8.

FIG. 9 is a flow diagram of the Process All Anchor Objects step 94 of FIG. 8. In a step 106, the note slip program checks whether the active application program calls the DrawPicture function from the system library. DrawPicture is a subprogram used by application programs on the Apple Macintosh to draw graphical images on the computer screen. In the current Macintosh system, both the actual displayed screen and several screens in memory right above and below the displayed screen are checked for graphical images. If the application program does not call DrawPicture, no graphical images are present on the computer screen, and the process is done at step 108. If the application program does call DrawPicture, then graphical images are present, some of which may be anchor object images; step 110 is then implemented. Similar programs to DrawPicture are typically used on other systems to display images on the computer screen.

In step 110, the note slip program intercepts the call made by the active application program to DrawPicture. The application program typically sends data to DrawPicture describing the graphical image, and DrawPicture uses the data to draw an image on the screen in a specified location. In the preferred embodiment, an anchor object exists as a PICT format object that the application program sends to DrawPicture; the PICT object includes the visual picture data shown on the screen as well as other invisible data in the anchor object. The invisible data includes picture comment data that describes the written ink and other features of the note slip (see FIG. 10). The note slip program intercepts the graphical image data before it reaches DrawPicture. In step 112, the note slip program analyzes the graphical image data to determine if the graphical image represents an anchor object or not. To accomplish this, the note slip program preferably compares the graphical image data or a portion of the graphical image data to a known set of visual picture data describing an anchor object. If the data does not match, then the graphical picture does not represent an anchor object, and step 114 is implemented, in which the note slip program sends the graphical data untouched to the DrawPicture subprogram, which displays it normally on the screen. The process is then complete at step 108.

If the picture data does match the known set of anchor object data, then the graphical image represents an anchor object, and step 116 is implemented. In step 116, the anchor object data is recorded in an "ink cache"; this process is detailed with reference to FIG. 9b. Once the anchor object is recorded, step 118 is implemented. A distinctive individual graphical image corresponding to the position of the anchor object in the ink cache is substituted for the original standard anchor object image sent by the application program. This procedure is detailed with reference to FIG. 9a. The substituted individual graphical image is then sent to the DrawPicture subprogram in step 114; DrawPicture displays the substituted individual image in the window 48 and the process is complete at step 108.

Figure 9A:
FIG. 9a is a schematic diagram showing examples of individual images used for the note anchor objects of the present invention.
Figure 9A:
Figure 9A:
Figure 9A:
Figure 9A:

In FIG. 9a, a table 119 is shown of individual anchor objects stored in the ink cache. Each anchor object displayed on the screen is placed in a specific position in the "ink cache", which is preferably a memory cache of found anchor objects. The ink cache can also be implemented using a disk drive or other storage means for primary or supplemental storage of anchor objects. For example, the first anchor object recognized by the note slip program is placed in position #1 of the ink cache, the second anchor object recognized is placed in position #2, and so on, up to the Nth position. In the preferred embodiment, N is equal to 100. So that the note slip program can distinguish between different anchor objects, a slightly different, individual visual picture data image 120 is assigned to each anchor object in the cache. For example, image 123 varies by a few pixels from image 124 so that the note slip program can distinguish between the anchor objects in positions #1 and #2 of the cache. Preferably, each position in the cache has a predetermined individual image associated with it. The individual images 120 are used by the video memory scan and related steps described with reference to FIG. 11.

Each anchor object recognized on the computer screen is assigned an ordered individual graphical image 120 that differs from the standardized anchor object image (shown in FIG. 10*a*) that is actually stored in the data file. Since the order of anchor objects in the ink cache depends on the order in which the anchor objects are recognized, a specific anchor object may have a different-looking image 120 each time a data file is first displayed. For example, a certain anchor object may be the second anchor object recognized in a text file and might be assigned position #2. If the text file is opened and viewed at a later time, the same anchor object might be the 10th object recognized and be assigned to position #10 in the cache, which has a different individual image associated with it.

Preferably, the individual images 120 include a portion 121 that is identical to each other to facilitate recognition by the later video memory scan steps explained with reference to FIG. 11. For example, the lower half 121 of images 120 can be identical to each other to promote easy recognition as an anchor object, while the upper half 122 of the images 120 can differ by a few pixels to distinguish each anchor object from the other anchor objects.

The rightmost column of the table 119 shows the picture comment data portion of each anchor object stored in the ink cache. The picture comment data describes the "ink" written by the user in a note slip 64. Picture comment data is described in more detail with reference to FIG. 10.

Figure 9B:
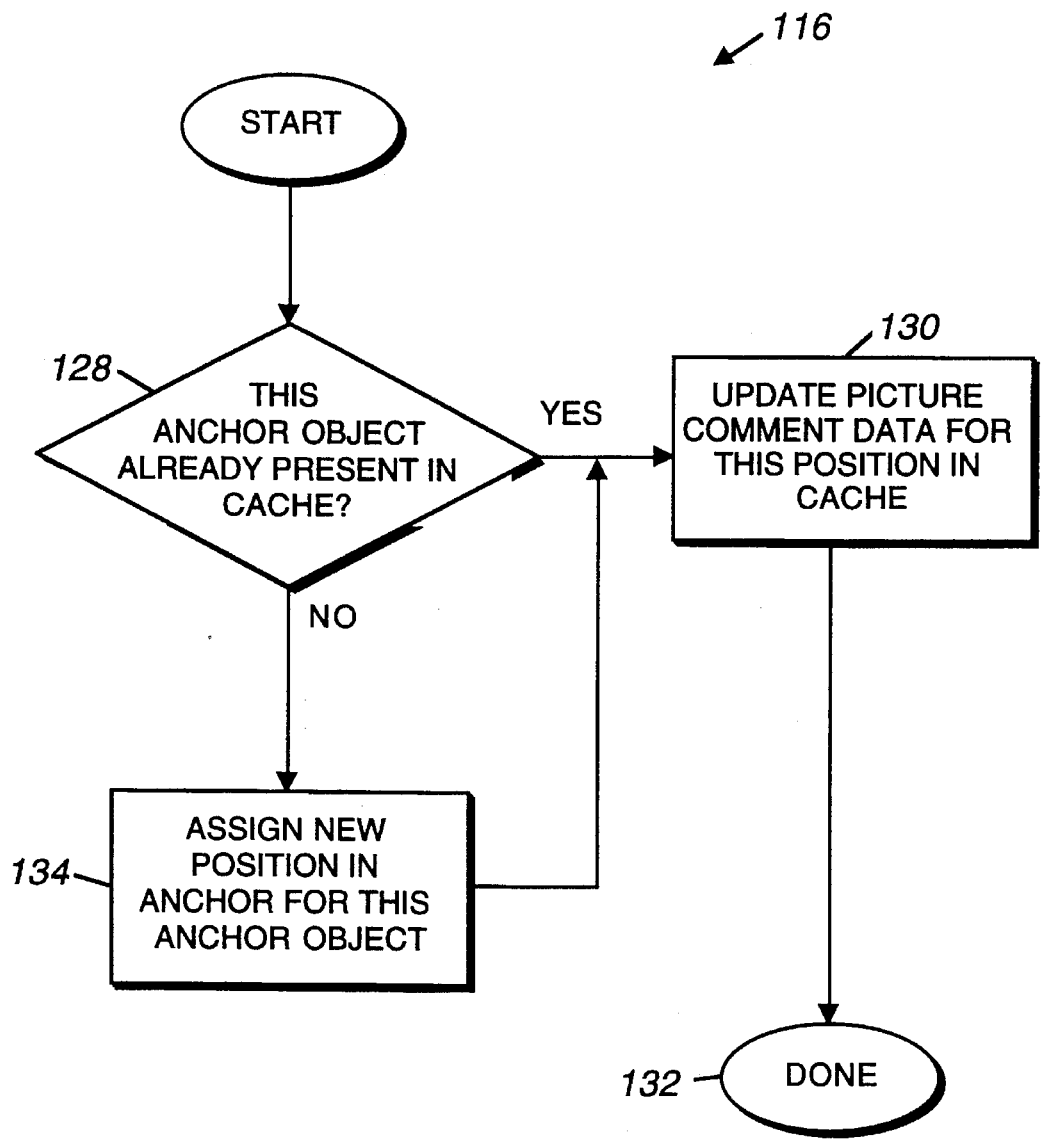
FIG. 9b is a flow diagram illustrating the "Record anchor object data in ink cache" step of FIG. 9.

In FIG. 9*b*, step 116 of FIG. 9 is detailed describing the assigning of an anchor object in the ink cache. In step 128, the note slip program checks if the recognized anchor object is already present in the ink cache. This is preferably accomplished by comparing an identification (ID) number of the anchor object with the ID numbers of all anchor objects already stored in the cache. The ID number is assigned to the anchor object at its creation or most recent update and is stored in the picture comment data portion of the anchor object, explained with reference to FIG. 10. In an alternate embodiment, no ID number is assigned to an anchor object, and the note slip program compares an anchor object's picture comment data bit by bit with all anchor objects in the cache to determine if the anchor object is already in the cache. If the anchor object is already present in the ink cache, step 130 is implemented, in which the corresponding picture comment data (as shown in FIG. 9*a*) is updated in the cache. The picture comment data of the anchor object may have changed since the anchor object was last recorded in the cache, so it must be updated in this step; i.e., ink may have been added or deleted, the size of note slip has been changed, etc. (see FIG. 12). The process is then complete at step 132.

If the anchor object was not already present in the ink cache at step 128, then step 134 is implemented. In this step, the anchor object is assigned a new position in the ink cache. Each position in the cache has a corresponding individual image 120 associated with it, which is assigned to the anchor object at step 118 in FIG. 9. After step 134, step 130 is implemented, in which the picture comment data describing the corresponding note slip's ink is updated at the anchor object's new position in the cache. The process is complete at step 132.

Figure 10:
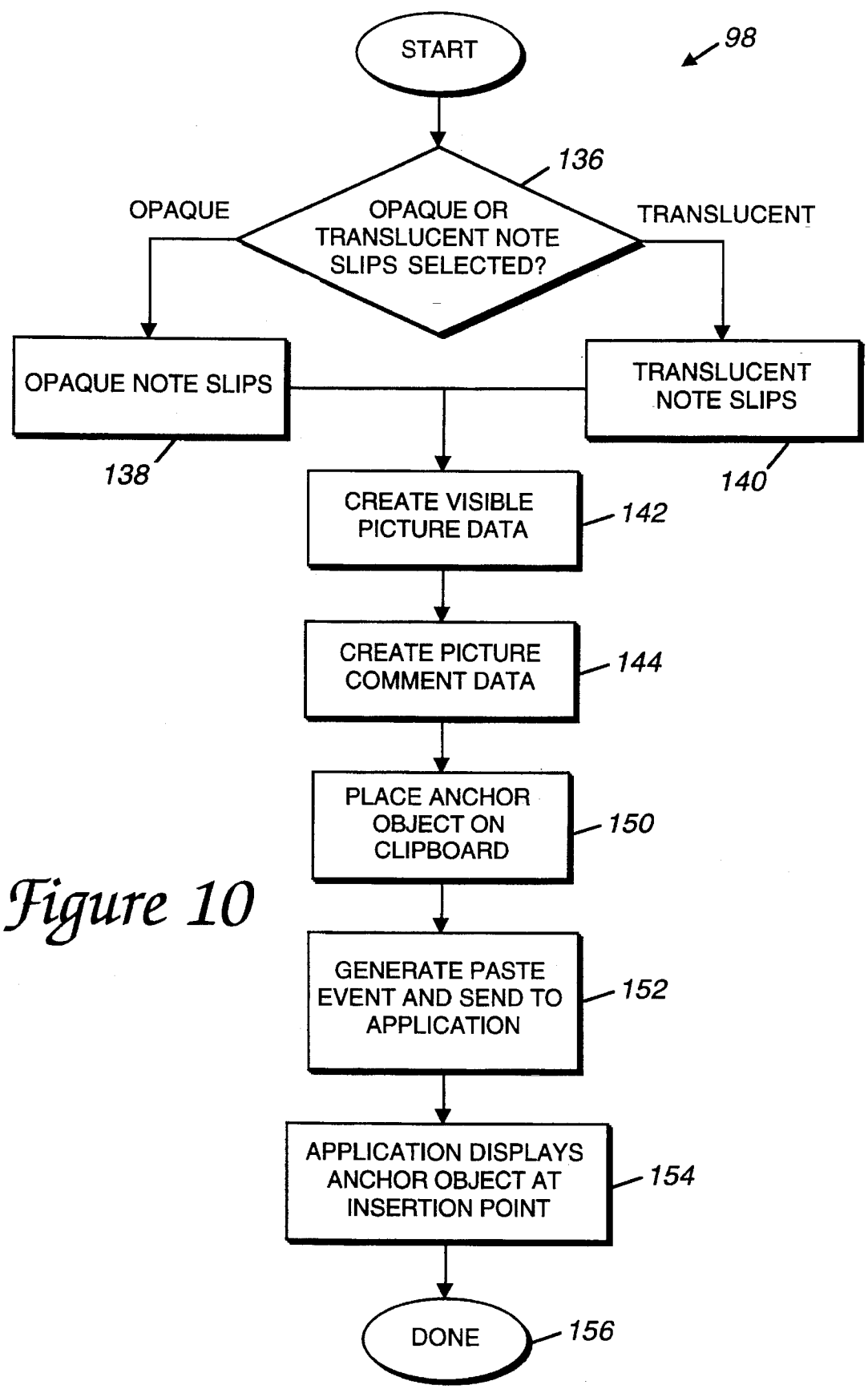
FIG. 10 is a flow diagram illustrating the "Create Note Slip" step of FIG. 8.
Figure 10A:
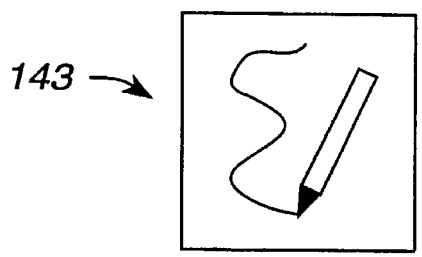
FIG. 10a is a schematic diagram showing the visual data portion of a note anchor object.

FIG. 10 is a flow diagram of process Create Note step 98 of FIG. 8. In a first step 136, the user's selection of opaque note slips (icon 59) or translucent note slips (icon 60) is checked. If the user selected opaque note slips, step 138 is implemented, which executes the opaque note slips section of the present invention. If translucent note slips were selected, the translucent note slips section of the present invention is executed at step 140.

In step 142, the visible picture data portion of an anchor object is created. A preferred embodiment of this visible data portion is image 143 shown in FIG. 10*a*. Preferably, the picture is stored in a PICT graphical format. Image 143 is a standardized anchor object image that is later stored in the data file 51, and differs from the displayed individual images shown in FIG. 9*a*.

Figure 10B:
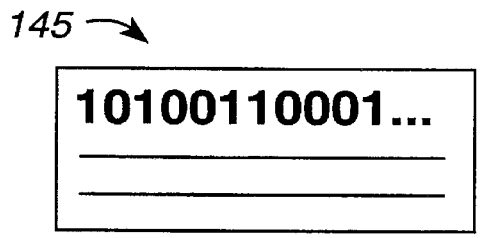
FIG. 10b is a schematic diagram showing the picture comment data of a note anchor object.

In step 144, the picture comment data portion of the anchor object is created. In the preferred embodiment, the anchor object is created as a data "object" with several different fields. The visible picture data is stored in the field of the object used to display an image on the screen. The picture comment data is stored in a different field of the object that is not displayed on the screen but is grouped with the visible picture data in the data file. FIG. 10*b* shows a representation of the picture comment data 145 as a separate field of the anchor object. Both the visual picture data shown in FIG. 10*a* and the picture comment data shown in FIG. 10*b* comprise an anchor "object".

Figure 10C:
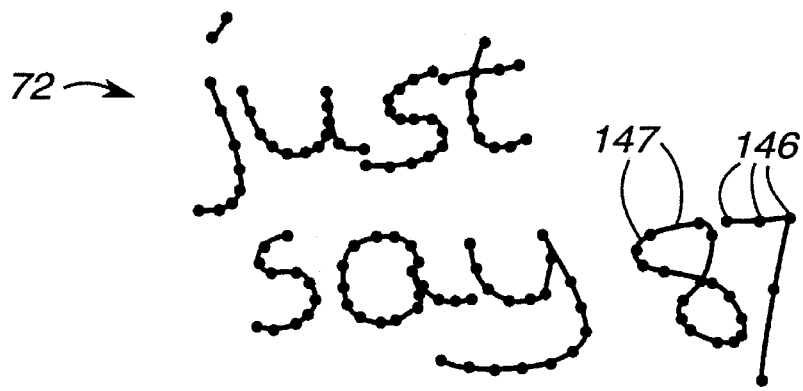
FIG. 10c is a schematic diagram showing the coordinate points and vectors of the ink of a written note.

The picture comment data includes a description of the ink that is written in writing area 68 of a note slip 64. A sample of ink 72 is shown in FIG. 10*c*. Points 146 are referenced in a coordinate system, and vectors 147 are drawn between the points 146. Ink 72 thus can be represented by a list of data representing the magnitude and direction of vectors 147 with reference to the coordinate system. In other embodiments, ink 72 can be represented by a bit-mapped image, so that each pixel of ink 72 is represented, for example, by a 1 bit in a list of binary numbers.

Figure 10D:
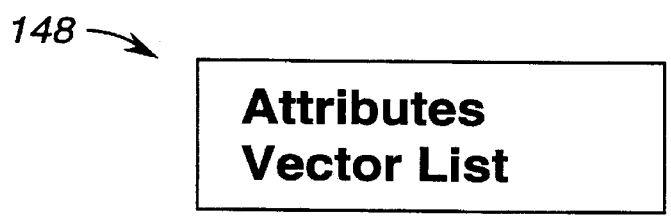
FIG. 10d is a schematic diagram showing the attribute and vector data of the picture comment data shown in FIG. 10b.

In FIG. 10*d*, an representation 148 of the picture comment data is shown. The picture comment data preferably includes the anchor ID number, which is assigned to the anchor object when the anchor object is created in step 144 or modified. The picture comment data also includes a set of attributes describing descriptive elements of a note slip such as ink stroke width, ink color/texture, size of the note slip image, the opened/closed status of the note slip, and the position of the note slip on the screen relative to the anchor object. The vector list describing the actual shape and location of the ink follows the attribute list in the picture comment data.

Referencing FIG. 10, step 150 resumes after the visible picture data and picture comment data portions of the anchor object have been created. In step 150, the anchor object is placed on the general memory buffer of the system, where text or other data is cut and pasted, and in the Macintosh operating system is called the Clipboard. In step 152, a paste event is generated by the note slip program and sent to the active application program. In the Macintosh operating system, an application program looks at a list of user actions called "events", which are stored in an "event queue" in the order of their occurrence. The events are executed by the application program in the order of the event queue. Step 152 sends a paste event to the event queue which is executed by the application program. In step 154, the application program "pastes" the Clipboard contents, i.e. the anchor object, in the current data file 51 at the insertion point, which is typically in front of the cursor 52. The anchor object inserted and stored in the data file includes the standardized anchor object image 143 shown in FIG. 10*a*. After the anchor object has been inserted, the process is done as indicated in step 156.

Figure 11:
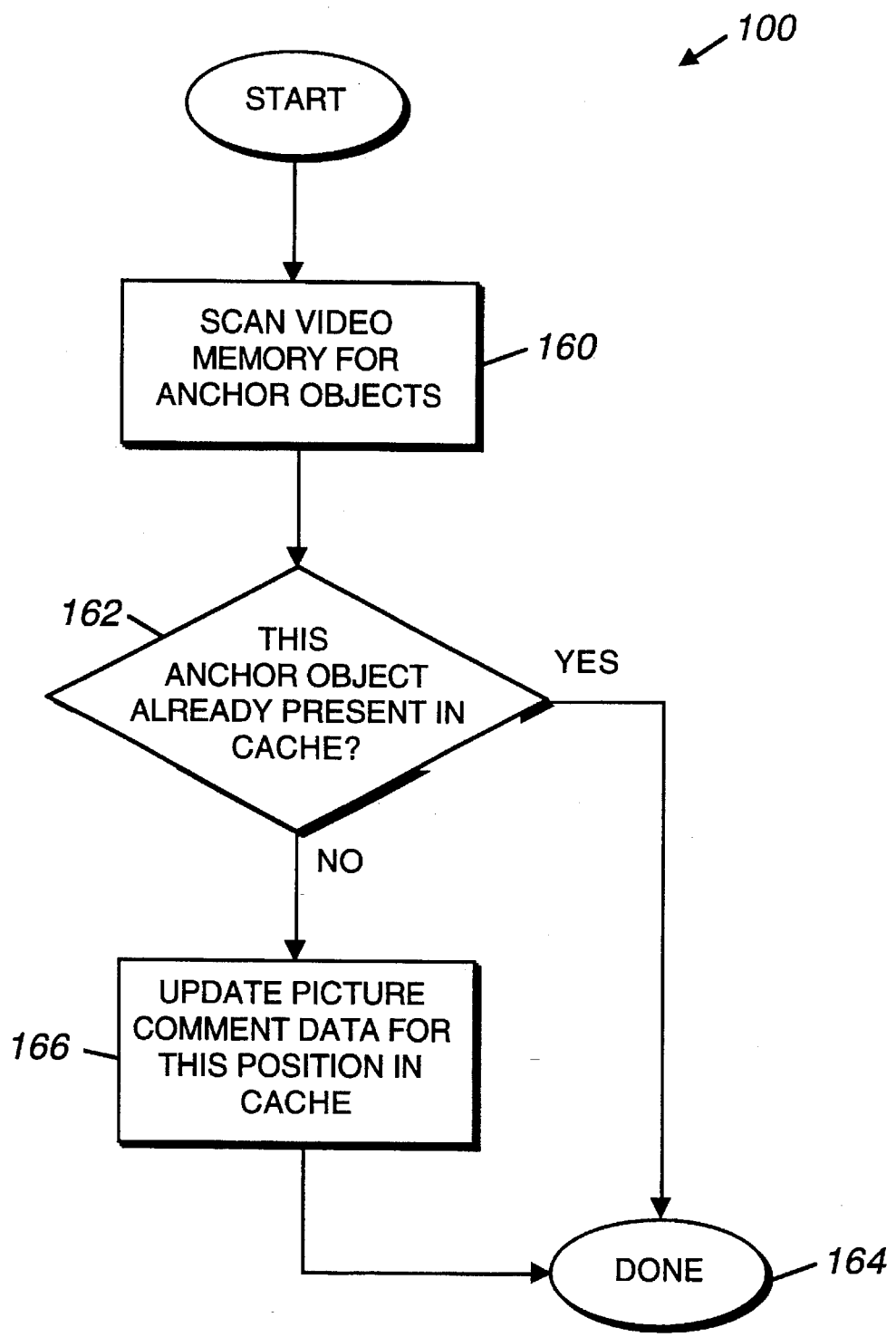
FIG. 11 is a flow diagram of the "Update Note Slip" step of FIG. 8.

FIG. 11 is a flow diagram of process Update Note Slips step 100 of FIG. 8. In a first step 160, the video memory, i.e. the displayed screen contents and any closeby off-screen data, is scanned to detect anchor objects. This is preferably accomplished using the method and apparatus described in co-pending U.S. patent application Ser. No. 07/970,689 by inventor Robert A. Pfeifer, entitled, "Method and Apparatus for Searching a Screen Image", assigned to the assignee of the present application and filed on Nov. 4, 1992, the disclosure of which is hereby incorporated herein by reference in its entirety. The video memory scan stores the positions of displayed images on the screen in RAM. In step 162, the current video memory scan is compared to the most recent prior video memory scan to determine if any anchor objects have been added, moved, deleted, or otherwise altered in position on the screen since the last scan. To accomplish this, the anchor objects must be distinguished from other graphical images in the video memory. Preferably, this is accomplished by recognizing a distinguishing portion of the individualized images 120 displayed. For example, the lower half of the individual images 120, as shown in FIG. 9a, could be searched for in video memory. If the anchor objects' positions in the video memory scan are constant since the most recent prior scan, no anchor objects have been moved, and the process is done at step 164.

If the anchor objects' positions are different since a prior video scan, or if there are a different number of anchor objects displayed on the screen, step 166 is implemented, in which the note slips' positions are updated on the screen to reflect the new positions of corresponding anchor objects. For example, if a certain anchor object has been moved within a text document, the corresponding note slip image 64, if displayed, must also be moved to preferably remain a fixed distance from the anchor object. Since each anchor object in video memory has unique picture comment data (note slip data) associated with it, individual anchor objects must be distinguished so that the correct note slip is moved with an anchor object. The individual anchor objects are distinguished by the individual images 120 described in FIG. 9a. Preferably, the upper half 122 of the images are used to distinguish an individual anchor object. Once the identity of an anchor object is found, the associated picture comment (note slip) data stored in the ink cache is used by the note slips program to change the position of the note slip on the screen to reflect the changed position of its associated anchor object. If an anchor object has been moved off screen, its corresponding note slip 64 is removed from the screen. After the note slips have been updated on the screen, the process is complete as indicated in step 164.

Figure 12:
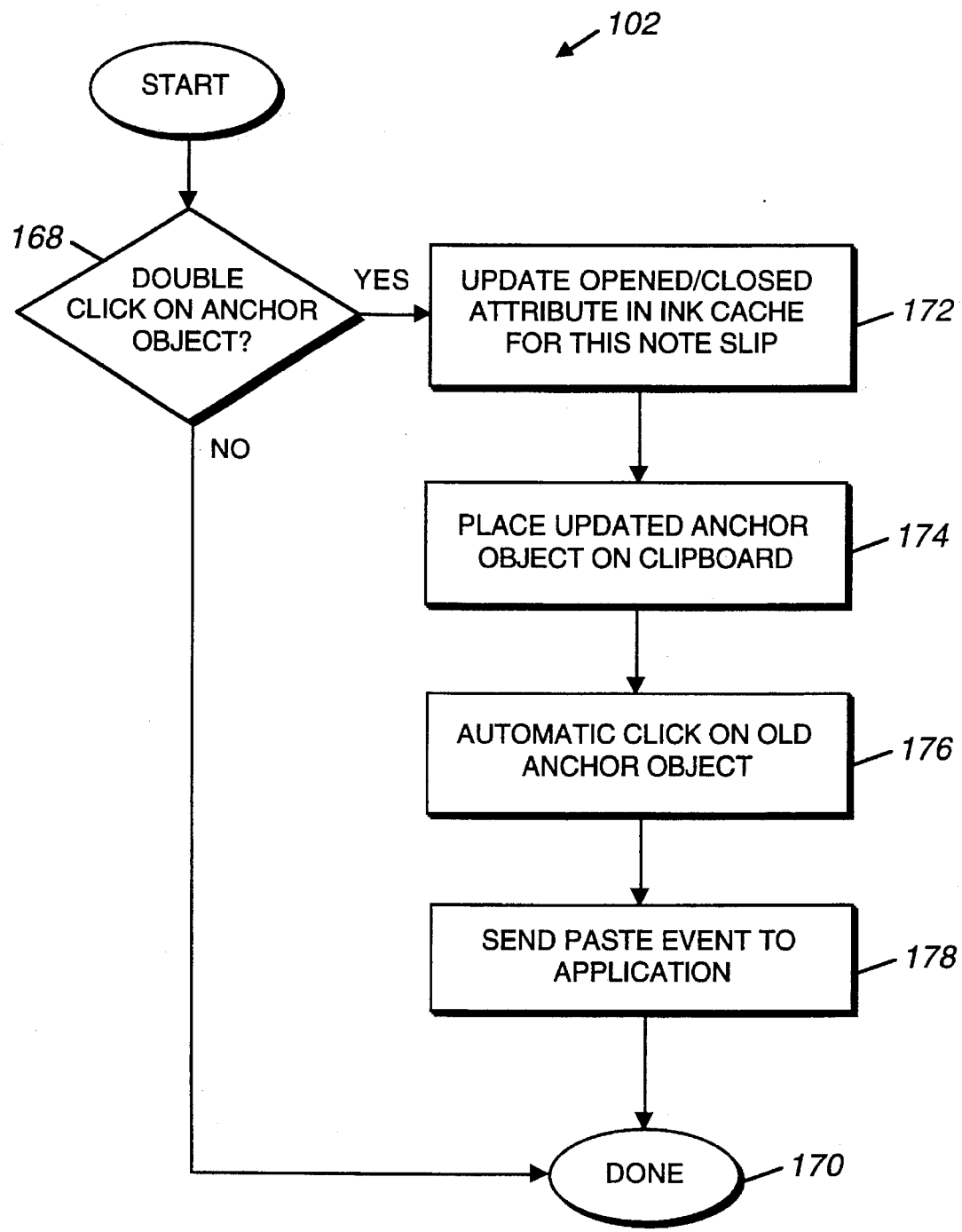
FIG. 12 is a flow diagram of the "Select Anchor Object" step of FIG. 8.

FIG. 12 is a flow diagram of process Select Anchor Object step 102 of FIG. 8. In a first step 168, the selection of the anchor object is checked to determine if it were a double click. A double click is a "click" of the pointing device done twice in rapid succession. If the anchor object were not double clicked, the process is done at step 170. If the anchor object were double clicked, step 172 is implemented. In step 172, the opened/closed attribute of the picture comment data for this anchor object is updated in the ink cache to "open" status. The note slip 64 is displayed on the screen by the note slip program. In step 174, the updated anchor object including this new opened/closed data is placed on the Clipboard memory buffer of the operating system. In step 176, the application program is instructed to automatically select the double-clicked anchor object in data file 51 so that the double-clicked anchor object can be replaced by the updated anchor object stored on the Clipboard. In step 178, a paste event is sent to the active application program to insert the updated anchor object into the displayed data file in place of the old anchor object. The process is then complete as indicated in step 170.

Figure 13:
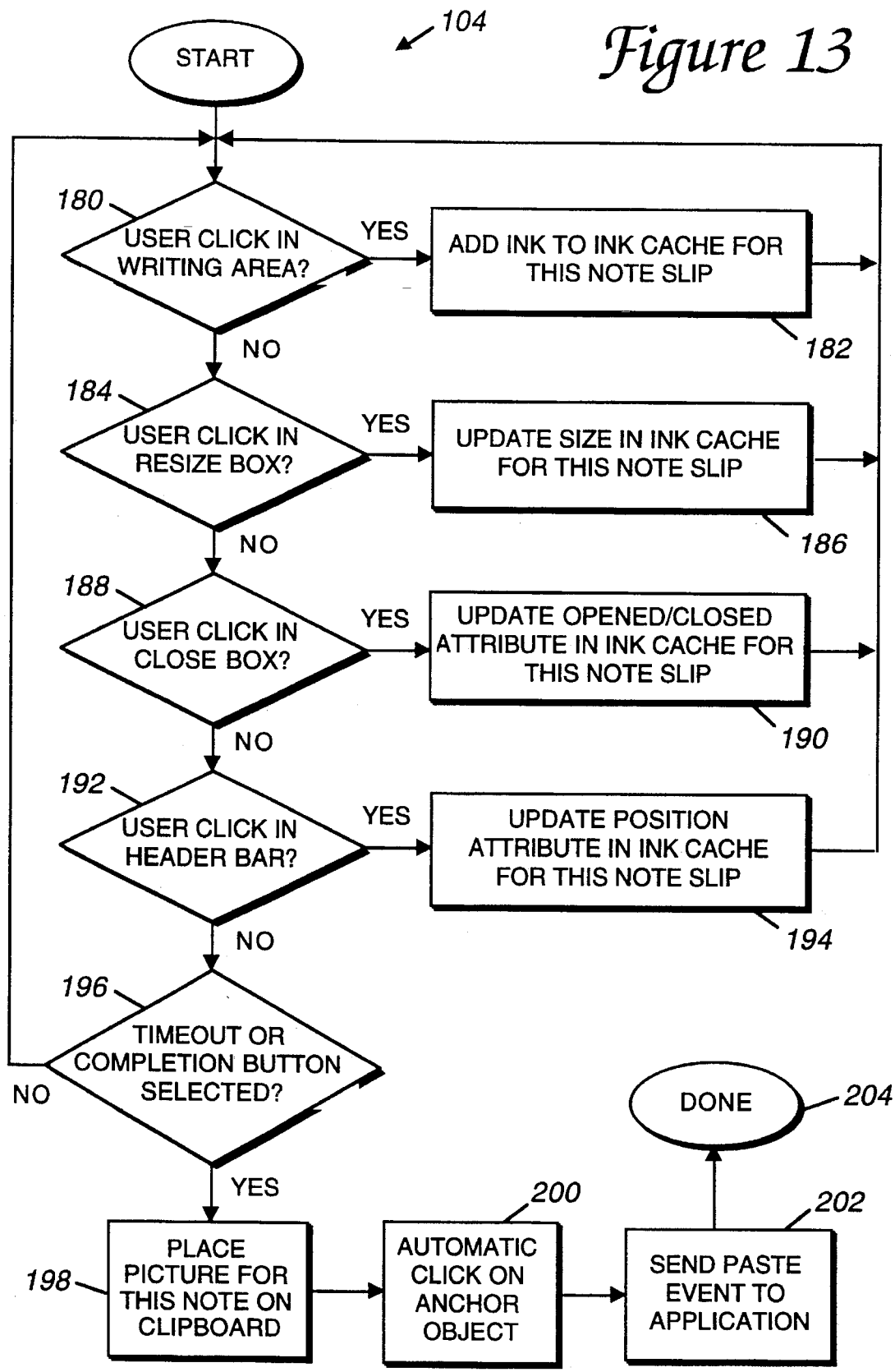
FIG. 13 is a flow diagram of the "Edit Note Slip" step of FIG. 8.

FIG. 13 is a flow diagram of process Edit Note Slip step 104 of FIG. 8. In a first step 180, the writing area 68 of note slip 64 is checked to determine if the user has clicked on it. If the writing area has been selected, step 182 is implemented, in which any written ink data in writing area 68 is added to the picture comment data section of this anchor object in the ink cache. The specific anchor object position in the cache associated with the updated note slip is known from the most recent video scan in step 160 of FIG. 11. The process then loops back to step 180. If the writing area 68 had not been selected at step 180, step 184 is implemented.

In step 184, the resize box 82 on header bar 66 of note slip 64 is checked if it has been selected by the user. If selected, step 186 is implemented, in which the size attributes in the picture comment data portion of the anchor object in the ink cache are updated with the current size of the note slip. The process then loops back to step 180. If the resize box 82 had not been selected at step 184, step 188 is implemented.

In step 188, the close box 69 on header bar 66 of note slip 64 is checked if it has been selected by the user. If selected, step 190 is implemented, in which the attribute of the picture comment data describing the open/close status of note slip 64 is updated for the current anchor object in the ink cache. The process then loops back to step 180. If the close box had not been selected at step 188, step 192 is implemented.

In step 192, the header bar 66 of note slip 64 is checked if it has been selected by the user. If selected, step 194 is implemented, in which the attribute of the picture comment data describing the position of the note slip relative the anchor object is updated for the current anchor object in the ink cache. The process then loops back to step 180. If the header bar had not been selected at step 192, step 196 is implemented.

In step 196, the completion button is checked if it has been selected by the user. If selected, or if an amount of time equaling TIMEOUT has transpired since the last user action (preferably 2 seconds), then step 198 is implemented. Otherwise, the process loops back to step 180. In step 198, the anchor object with updated picture comment data is sent to the Clipboard memory buffer of the operating system. In step 200, the application program is instructed to automatically select the old anchor object associated with the updated note slip so that the old anchor object can be replaced by the updated anchor object. The position of the old anchor object on the screen is known by the most recent video scan. In step 202, a paste event is sent to the active application program to insert the updated anchor object into the data file in place of the old anchor object. The process is then complete as indicated in step 204.

Of course, the multiple decision steps 180, 184, 188, 192, and 196 can also be handled concurrently with appropriate software.

Since the active application program is not aware of the note slip 64 or the individual images 120 in the processes described above, the present invention can be used on computer systems that are not pen-aware or note-aware. The note slips program handles all the pen inputs and note slips, leaving the application program to display only the standardized anchor object images stored in the data file.

While this invention has been described in terms of several preferred embodiments, there are alterations, permutations, and equivalents which fall within the scope of this invention. It is therefore intended that the following appended claims be interpreted as including all such alterations, permutations, and equivalents as fall within the true spirit and scope of the present invention.

What is claimed is:

1. A method for providing a handwritten note on an application program image comprising:

noticing a note anchor object included with application data processed by an application program, wherein said note anchor object is manipulable as said application data by a function of said application program that processed said application data, said manipulation including moving, deleting, or inserting said anchor object as said application data; and displaying a note slip image and an application image on a computer screen, said application image being created on said computer screen by said application program, said note slip image being displayed on said computer screen by a note slip program executing simultaneously with said application program, said note slip image being associated with said noticed note anchor object and portraying a handwritten note.

2. A method as recited in claim 1 wherein said step of noticing a note anchor object is accomplished by recognizing said note anchor object as a known anchor object and wherein said application image portrays said application data.

3. A method as recited in claim 2 wherein said known anchor object comprises a graphical image.

4. A method as recited in claim 1 further comprising a step of entering a note data image on to said note slip image with user input means.

5. A method as recited in claim 4 wherein said user input means comprises moving a stylus on a tablet.

6. A method as recited in claim 1 further comprising a step of creating said note anchor object associated with said application data in response to a user input prior to said step of noticing said note anchor object.

7. A method as recited in claim 1 wherein said application image is formed within a displayed application window associated with said application program, and wherein said application program is interfaced with a user through a graphical user interface that is able to interface said user with other application programs.

8. A method as recited in claim 1 wherein of said application program can move, delete, or insert said anchor object within said application said application program is a word processor and said application data includes text.

9. A method as recited in claim 1 wherein said application data processed by said application program was created by said application program.

10. A method as recited in claim 1 wherein said application data processed by said application programs was retrieved from a storage device by said application program.

11. A method for providing a handwritten note for an application program running on a pen computer system comprising:

displaying on a computer screen a note anchor object and an application image created by an application program, said application image portraying application data developed by said application program, said note anchor object being included with said application data;

noticing said note anchor object, said note anchor object being treated as application data by a function of said application program and being manipulable as said application data;

displaying a note slip image on said computer screen, said note slip image being associated with said note anchor object and being displayed by a note slip program being executed simultaneously with said application program; and entering a note data image describing a handwritten note on said note slip image with a stylus and a tablet.

12. A method as recited in claim 11 wherein said step of noticing said note anchor object is accomplished by recognizing a known anchor object representing said note anchor object.

13. A method as recited in claim 12 wherein said known anchor object comprises a graphical image.

14. A method as recited in claim 13 wherein said note anchor object includes a visible picture portion providing an image of said anchor object and a picture comment data portion including data describing said note data image.

15. A method as recited in claim 14 wherein said picture comment data portion includes note data.

16. A method as recited in claim 14 wherein said step of noticing said note anchor object is accomplished by recognizing said visible picture data portion of said note anchor object.

17. A method as recited in claim 15 wherein said note data includes data describing the size and location of said note slip image on said computer screen.

18. A method as recited in claim 13 wherein said application data includes standard text objects, such that said note anchor object is manipulable by said application program as a standard text object, and further comprising the step of manipulating said note anchor object as said application data by a function of said application program that is operative to manipulate said text objects in said application program.

19. A method as recited in claim 12 further comprising the step of moving said note slip image relative to said application image.

20. A method as recited in claim 19 further comprising the step of moving said note slip image by moving said note anchor object relative to said application image.

21. A method as recited in claim 20 further comprising the step of varying the size of said note slip image.

22. A method as recited in claim 20 wherein said step of displaying a note slip image includes displaying a plurality of note slip images over said application image corresponding to a plurality of anchor objects.

23. A method as recited in claim 22 wherein said plurality of anchor objects are stored in an ordered memory cache.

24. A method as recited in claim 22 wherein each of said plurality of anchor objects is represented by a different graphical image.

25. A method as recited in claim 11 wherein said note slip image is translucent such that portions of said application image covered by said note slip image are visible.

26. A method as recited in claim 11 wherein a function of said application program is operative to manipulate said anchor object by moving, deleting, or inserting said anchor object as if said anchor object were said application data developed by said application program.

27. A pen computer system as recited in claim 26 wherein said application program can insert anchor object within said application data at a location of a cursor displayed by said application program.

28. A pen computer system comprising:

a central processing unit (CPU);

a display screen coupled to said CPU;

a tablet coupled to said CPU;

a stylus coupled to said tablet for entering data on said tablet;

means for noticing a note anchor object associated with application data developed by an application program, wherein a function of said application program can move, delete, or insert said anchor object within said application data developed by said application program;

means for displaying a note slip image over an application image created on a computer screen by said application program, wherein said means for displaying a note slip image includes a note slip program executing simultaneously with said application program; and means for entering a note data image describing a handwritten note on said note slip image with said stylus and said tablet.

29. A pen computer system as recited in claim 28 wherein said means for noticing a note anchor object includes means for recognizing an anchor object comprising a graphical image.

30. A pen computer system as recited in claim 29 wherein said note anchor object includes a visible picture data portion and a picture comment data portion, said picture comment data portion including note data.

31. A pen computer system as recited in claim 30 wherein said note slip image is translucent such that portions of said application image covered by said note slip image are visible.

32. A pen computer system as recited in claim 28 wherein said means for displaying includes means for displaying a plurality of note slip images on said application image corresponding to a plurality of anchor objects.

33. A pen computer system as recited in claim 32 wherein a single note slip image is associated with a single anchor object.

34. A pen computer system as recited in claim 28 wherein said application image is derived from said application data and said note slip image is associated with said note anchor object, and wherein said anchor object can be moved, deleted and inserted by a function of said application program as if said anchor object were text.

35. A method for providing a handwritten note for an application program running on a pen computer system comprising:

executing a note slip program simultaneously with an application program on said pen computer system, said application program being able to process and display a data document;

creating a note anchor object in a memory when instructed by a user, said note anchor object including a visible picture data portion representing a graphical image of said note anchor object and a picture comment data portion;

inserting said note anchor object into a data document displayed by said application program on a computer screen from said memory, said note anchor object being inserted into said data document at a location indicated by a cursor of said application program, wherein a function of said application program can move, delete, or insert said anchor object within said data document and wherein said anchor object is displayed within said displayed data document as said graphical image;

displaying a note slip image associated with and relative to said note anchor object when said note anchor object is selected by said user, where a location of said note slip image relative to said note anchor object and a size of said note slip image are adjustable by said user, said note slip image being displayed by said note slip program; and entering handwritten data on said note slip image with a stylus, said handwritten data and said size and location of said note slip image on said computer screen being stored in said picture comment data portion of said note anchor object.

36. A method as recited in claim 35 further comprising the steps of:

erasing said note slip image from said computer screen;

selecting said note anchor object;

displaying said note slip image on said computer screen, said note slip image having said location and size stored in said picture comment data portion of said note anchor object.

37. A method as recited in claim 35 further comprising a step of said note slip program noticing said note anchor object by recognizing said visible picture data portion of said note anchor object.

38. A method as recited in claim 35 further comprising the step of manipulating said note slip image using a function of said application program.

39. A method as recited in claim 38 wherein said manipulating includes moving said note anchor object relative to said application image using a function of said application program.

40. A method as recited in claim 38 wherein said manipulating includes copying said note anchor object by storing said data portions of said note anchor object in said memory and pasting said data portions of said note anchor object at another location in said application program as said application data using a function of said application program, said function also being able to perform said storing and pasting operations on other data included said data document.

41. A method as recited in claim 40 further comprising a step of creating and displaying a plurality of said note anchor objects in said data document and displaying a plurality of said note slip images corresponding to said plurality of anchor objects, wherein a single note slip image is associated with a single anchor object.

42. A method as recited in claim 41 wherein said plurality of anchor objects are stored in an ordered memory cache and wherein each of said plurality of anchor objects is represented by a different graphical image.

43. A method as recited in claim 35 wherein said note slip image is either opaque such that portions of said application image covered by said note slip image are not visible or translucent such that portions of said application image covered by said note slip image are visible.

44. A pen computer system for providing a handwritten note for an application program running on said pen computer system, said application program being able to process and display text application data, said pen computer system comprising:

a central processing unit (CPU);

a buffer memory coupled to said CPU;

a display screen coupled to said CPU;

a tablet coupled to said CPU;

a stylus coupled to said tablet for entering data on said tablet;

means implemented on said CPU for creating a note anchor object in said buffer memory when instructed by a user, said note anchor object including a visible picture data portion describing a graphical image of said note anchor object and a picture comment data portion;

means implemented on said CPU for pasting said note anchor object into a data document displayed by said application program on said display screen from said buffer memory, said note anchor object being inserted into said data document at a location indicated by a cursor of said application program, said note anchor object being treated as text application data, being manipulable by said application program as text application data and being displayed within said displayed data document as said graphical image;

means implemented on said CPU for displaying a note slip image on said display screen associated with and relative to said note anchor object when said note anchor object is selected by said user;

means implemented on said CPU for entering handwritten note data on said note slip image with a stylus and a tablet, said handwritten note data and a size and location of said note slip image on said display screen being stored in said picture comment data portion of said note anchor object.

45. A pen computer system as recited in claim 44 further comprising means implemented on said CPU for noticing said note anchor object in said data document.

46. A pen computer system as recited in claim 45 further comprising means implemented on said CPU for manipulating said note slip image using a function of said application program as if said note slip image were an application image developed by said application program.

47. A pen computer system as recited in claim 46 wherein said note slip image includes a completion button operative to erase said note slip image, and wherein said computer system further includes means implemented on said CPU for displaying said note slip image when said user selects said note anchor object.

48. A pen computer system as recited in claim 44 wherein said means for displaying includes means for displaying a plurality of note slip images on said application image corresponding to a plurality of anchor objects, wherein a single note slip image is associated with a single anchor object.

49. A pen computer system as recited in claim 46 wherein said note slip image is translucent such that portions of said application image covered by said note slip image are visible.

* * * * *